United States Patent [19]

Cook

[11] Patent Number: 4,714,322

[45] Date of Patent: Dec. 22, 1987

[54] REAR VIEW MIRROR WITH DAY/NIGHT SETTING AND ADJUSTABLE PANORAMIC VIEW

[76] Inventor: Charles Cook, 4001 N. Chapman, Shawnee, Okla. 74801

[21] Appl. No.: 835,751

[22] Filed: Mar. 3, 1986

[51] Int. Cl.⁴ .......................... B60R 1/04; G02B 17/00
[52] U.S. Cl. ................................................ 350/281
[58] Field of Search ....................... 350/281, 626, 627

[56] References Cited

U.S. PATENT DOCUMENTS 2,214,369 9/1940 Lenta ................................. 350/627

Primary Examiner—John K. Corbin
Assistant Examiner—Rebecca D. Gass
Attorney, Agent, or Firm—Robert B. Stevenson

[57] ABSTRACT

A rear view mirror assembly comprising a ball and socket support member that attaches to the windshield and pivotally holds a mirror housing on a selectable over center mechanism with a multiple segmented prismoidal mirror within the housing having the central mirror segment fixed to the housing and the other mirror segments hinged vertically to the central mirror with a threadable means to adjust each hinged mirror segment relative to the housing. Such a rear view mirror assembly provides a selectable day/night setting and adjustable panoramic view.

2 Claims, 5 Drawing Figures

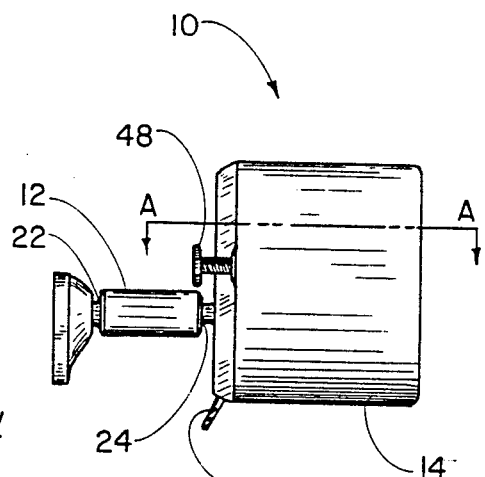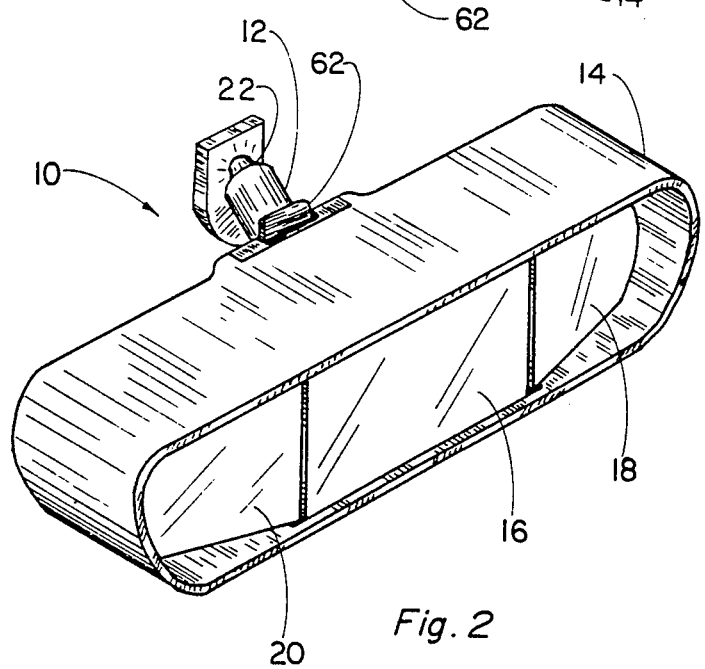

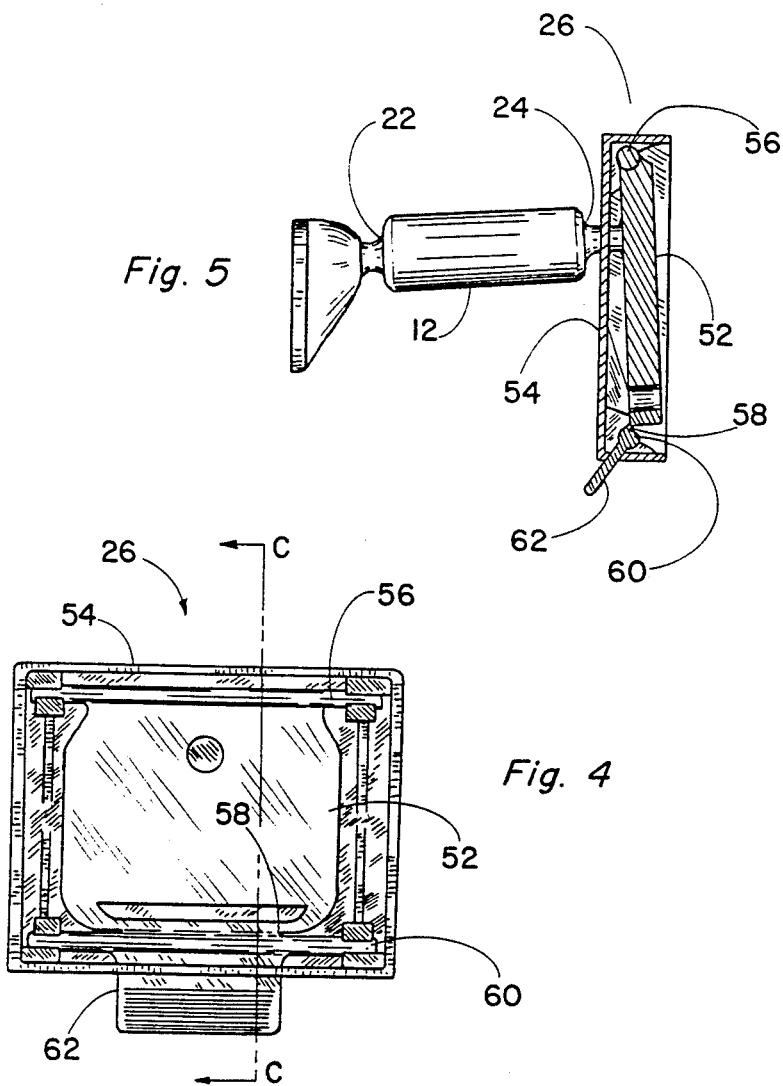

REAR VIEW MIRROR WITH DAY/NIGHT SETTING AND ADJUSTABLE PANORAMIC VIEW

BACKGROUND OF THE INVENTION

1. Field of the Invention

This invention relates to a rear view mirror for vehicles. More specifically, the invention relates to a rear view mirror with an adjustable panoramic view and a selectable day or night setting.

2. Description of the Prior Art

The basic concept of providing the interior of the windshield of a vehicle with a rear view mirror that involves a panoramic view of what is behind and to each side of the vehicle is generally known. Thus, it has been suggested in the past to provide a segmented mirror with individual segments adjustable directed to separate viewing directions. It has also been generally known to provide a non-segmented, unidirectional rear view mirror with a selectable day or night setting. However, prior to the present invention, the concept of providing both panoramic adjustability and day/night selectability without compromising the quality or ease of operation of both at no significant increase in cost has not been available.

SUMMARY OF THE INVENTION

In view of the prior art, I have discovered and developed an improved rear view mirror that combines the day/night setting feature with an adjustable panoramic view concept without significantly sacrificing ease of operability, optical quality or cost. Thus, the present invention provides a rear view mirror assembly comprising:

(a) a support member adapted to fasten to and be suspended to the center of the windshield terminating in an adjustable ball and socket coupling displaced away from the windshield;

(b) a mirror housing;

(c) an over center means pivotally attached to the mirror housing through an upper and a lower axis and further attached between the upper and lower axis of the support member through the adjustable ball and socket coupling such that the selection of positions of the over center means displaces the lower axis and housing relative to the upper axis creating a selectable change in the tilt of the housing;

(d) a plurality of primoidal mirror segments sequentially positioned within the mirror housing with the centrally located mirror segment rigidly fixed to the housing and each successive mirror segment vertically hinged to the adjacent mirror segments within the housing; and (e) a plurality of adjustable means each threadably attached to the housing and one of the successive hinged mirror segments such as to adjust the hinged mirror segments relative to the housing and thereby direct the hinged mirror segment towards a desired direction of view.

It is an object of the present invention to provide a rear view mirror that simultaneously features an adjustable panoramic view and a selectable day/night setting. It is a further object of the present invention to provide such a mirror assembly at essentially no significant compromise as to ease of operation or optical quality. Fulfillment of these objects and the presence and fulfillment of additional objects will become apparent upon complete reading of the specification and claims taken in conjunction with the attached drawings.

BRIEF DESCRIPTION OF THE DRAWINGS

FIG. 1 is a perspective side view of a typical rear view mirror assembly according to the present invention.

FIG. 2 is an inverted or a bottom perspective view of the rear view mirror assembly of FIG. 1.

FIG. 4 is a close up view of the over center mechanism of the rear view mirror housing of FIG. 3 as seen through line B—B.

FIG. 5 is a partial cross-sectional side view of the over center mechanism of FIG. 4 as seen through line C—C.

DESCRIPTION OF THE PREFERRED EMBODIMENTS

Figure 3:
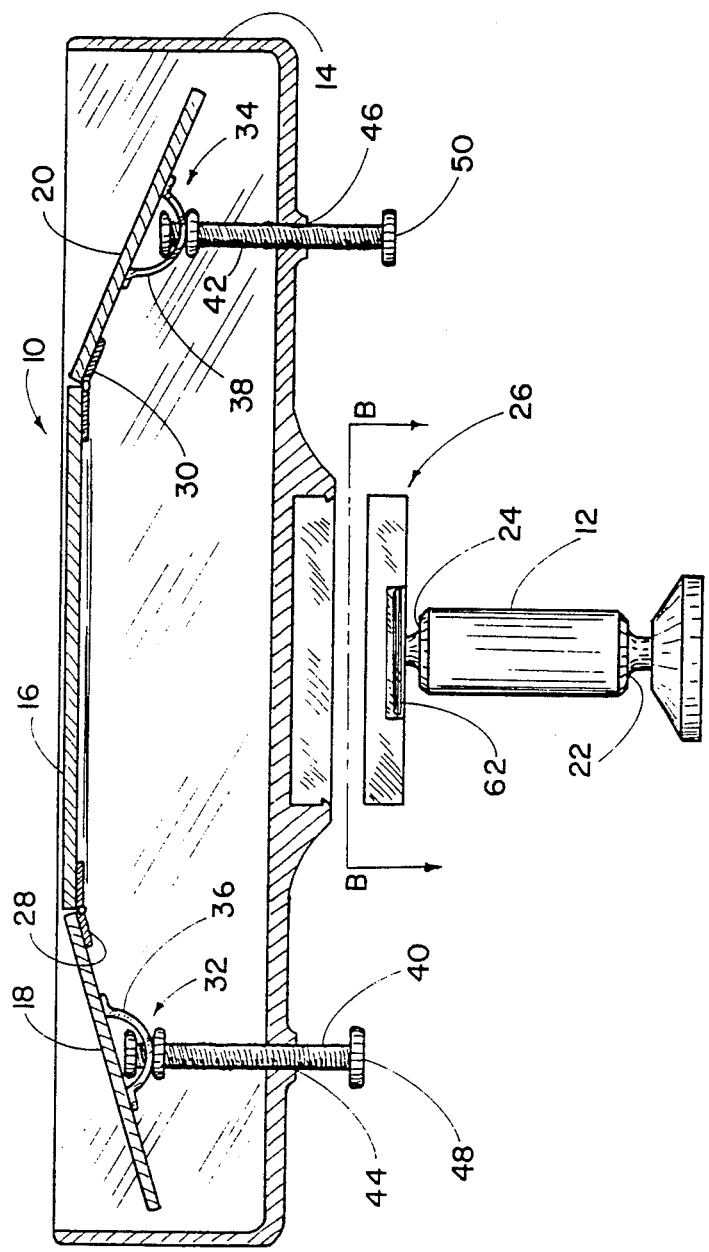
FIG. 3 is a top, cross-sectional view of the rear view mirror of FIG. 1 as seen through line A—A with the over center mechanism withdrawn from the mirror housing.

The improved rear view mirror, how it functions, how it differs from the previously known rear view mirrors and the advantages of its use can perhaps be best explained and understood relative to the drawings. FIG. 1 illustrates a side view of a typical rear view mirror according to the present invention, generally designated by the numeral 10. As illustrated, the rear view mirror assembly 10 involves an adjustable support member 12 that is intended to be attached to the windshield of the like of the vehicle and extend back towards the interior of the vehicle. Suspended on the rearmost end (i.e., furtherest to the interior of the vehicle) of the support member 12 is a mirror housing 14 which in this specific embodiment (see FIGS. 2 and 3) contains a three segment prismoidal mirror (i.e., a so-called prism day/night mirror) wherein the center segment 16 is rigidly attached to the housing 14 and the two sloped side mirrors 18 and 20 are adjustably hinged to the center mirror segment 16.

As further illustrated in FIG. 3, the support member 12 of the rear view mirror assembly 10 involves a pair of ball and socket type couplings 22 and 24 that allow the driver of the vheicle to adjust the height and direction of the mirror housing 14 during use. The second ball and socket coupling 24 attaches to an over center mechanism 26 which in turn is attached to the housing 14 at two specific axis of rotation for selectively tilting the entire mirror housing 14 and creating the day/night setting feature as explained later.

Centrally located mirror segment 16 is rigidly attached to the housing 14 and thus moves with the housing. Each of the sloped side mirror segments 18 and 20 are hinged vertically to the central mirror segment 16 by hinges 28 and 30. On the inner, backside of the hinged mirror segments 18 and 20 are adjustable mechanisms 32 and 34. Each adjusting mechanism involves a rotatable pivot fastener 36 or 38 attached to the back of the mirror segments 18 and 20. Threaded rods 40 and 42 extend through the rotatable pivot fasteners 36 and 38 through threaded openings 44 and 46 in the mirror housing 14 and terminate externally to the housing 14 with manual adjusting knobs 48 and 50. In this manner, the driver of the vehicle can adjust the height and direction of view through the central segment 16 of the mirror by adjusting the housing 14 about the pair of ball and socket joints 22 and 24 of the support member 12.

Having adjusted the direction of view through central mirror segment 16, the knobs 48 and 50 can then be used to adjust the relative degree of slope or more specifically, angle of rotation of the side mirror segments 18 and 20 about hinges 28 and 30. Optionally, the external portion of the threaded rods 40 and 42 between the mirror housing 14 and adjusting knobs 48 and 50 can be provided with lock nuts (not shown) that are tightened after adjusting side mirror segments 18 and 20 such as to prevent any further change in relative position of the adjustable side mirror segments within the housing.

As seen in FIGS. 4 and 5, the over center mechanism 26 that creates the day/night selectivity involves a substantially rigid, but yet, intentionally somewhat flexible vertical surface 52. This surface 52 is attached to the inner top of the housing 54 through an axis of rotation about axle 56. At the lower more flexible end of the surface (see opening therein) is a molded, flexible hinge 58 that is attached to a second axle 60. This second lower axle 60 is rotatably attached to the lower portion of housing 54 and has a manual tab or lever arm 62 extending downward and protruding out of the housing 54 (see FIGS. 1 and 2). Since the point of attachment 64 of the ball and socket coupling 24 is to the upper middle or central portion of surface 52, the switching of the tab or lever arm 62 results in a relative rotation about axles 56 and 60 that produce a change in tilt in the housing 54. Since housing 54 of the over center mechanism 26 inserts into mirror housing 14, this over center type motion or cam action also results in a change in tilt of all of the mirror segments 16, 18 and 22 held within the mirror housing 14. Since the mirror segments are made of prismoidal mirror, the transition between two different degrees of tilt produces the day/night effect as generally known in the art.

Thus, as illustrated in the drawings, the rear view mirror assembly according to the present invention achieves both adjustable panoramic view as well as day/night selectivity. By manually using the toggle action of the over center mechanism which results in a change in tilt of all mirror segments, the reflective pathway of the prismoidal mirror is changed and hence, the day/night setting effect is achieved. The adjustable panoramic view concept is simultaneously achieved by separately adjusting the angle of the side mirrors relative to the central fixed mirror within the selectively tiltable mirror housing. The actual construction of the mirror assembly according to the present invention can be by any method and out of any material conventionally used in the art. Preferably, the components of the mirror housing and over center mechanism are fabricated out of molded plastic, while the ball and socket mechanism of the mirror support are made of metal. The mirror segments are necessarily fabricated out of prism or prismoidal mirror as generally known in the art. It should be further appreciated that the mirror housing and over center mechanism could be fabricated as a single housing unit or assembly and as such, a separate housing for the over center mechanism is not necessary. The method of attaching the mirror assembly to the interior of the vehicle can be by any method generally known in the art, including adhesively bonding the assembly directly to the glass or anchoring the assembly as part of the interior trim of the vehicle.

Having thus described the invention with a certain degree of particularity, it is manifest that many changes can be made in the details of the invention without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

I claim:

1. A rear view mirror assembly comprising:
   (a) a support member adapted to fasten to and be suspended to the center of the windshield terminating in an adjustable ball and socket coupling displaced away from the windshield;
   (b) a mirror housing;
   (c) an over center means pivotally attached to said mirror housing through an upper and a lower axis and further attached between said upper and lower axis to said support member through said adjustable ball and socket coupling such that the selection of positions of the over center means displaces the lower axis and housing relative to the upper axis creating a selectable change in the tilt of said housing;
   (d) a plurality of prismoidal mirror segments sequentially positioned within said mirror housing with the centrally located mirror segment rigidly fixed to said housing and each successive mirror segments vertically hinged to said adjacent mirror segments within said housing; and
   (e) a plurality of adjustable means each threadably attached to said housing and one of said successive hinged mirror segments such as to adjust said hinged mirror segments relative to said housing and thereby direct said hinged mirror segment towards a desired direction of view.

2. A rear view mirror assembly of claim 1 wherein said plurality of mirror segments consist of three mirror segments wherein said center mirror segment is rigidly attached to said mirror housing and said plurality of said adjustable means consists of two adjustably threadable means passing through threaded openings in said mirror housing and pivotally attaching to the backside of one of said mirror segments hinged to said centrally positioned fixed mirror segment.

* * * * *